United States Patent
Hörmann et al.

[11] Patent Number: 6,131,715
[45] Date of Patent: Oct. 17, 2000

[54] PROCESS FOR CONNECTING A FLYWHEEL OF A CLUTCH WITH A CLUTCH

[75] Inventors: Karl Hörmann, Schweinfurt; Klaus Gorzitzke, Gochsheim; Achim Link, Schweinfurt, all of Germany

[73] Assignee: Mannesmann Sachs AG, Schweinfurt, Germany

[21] Appl. No.: 09/345,036

[22] Filed: Jun. 30, 1999

[30] Foreign Application Priority Data

Jun. 30, 1998 [DE] Germany .......................... 198 29 104

[51] Int. Cl.⁷ .................................................... F16D 13/58
[52] U.S. Cl. ........................ 192/70.16; 74/572; 403/282; 29/510
[58] Field of Search ............................... 192/70.16, 70.27, 192/89.22, 89.24; 74/572; 403/279, 282; 29/510, 516, 525

[56] References Cited

U.S. PATENT DOCUMENTS

| | | | |
|---|---|---|---|
| 4,600,092 | 7/1986 | Billet et al. | 192/89.24 X |
| 5,143,190 | 9/1992 | Westendorf et al. | 192/70.27 |
| 5,293,978 | 3/1994 | Reik et al. | 192/70.17 |
| 5,392,888 | 2/1995 | Kajitani et al. | |
| 5,643,542 | 7/1997 | Grosse-Erdmann et al. | |
| 5,651,441 | 7/1997 | Viola et al. | 192/70.11 |

FOREIGN PATENT DOCUMENTS

| | | |
|---|---|---|
| 40 14 470 | 11/1991 | Germany . |
| 44 02 849 | 8/1994 | Germany . |
| 44 24 479 | 1/1996 | Germany . |
| 1 095 754 | 12/1967 | United Kingdom . |
| 1 414 336 | 11/1975 | United Kingdom . |
| 2 006 895 | 5/1979 | United Kingdom . |
| 2 243 884 | 11/1991 | United Kingdom . |
| 2 248 476 | 4/1992 | United Kingdom . |

*Primary Examiner*—Richard M. Lorence
*Attorney, Agent, or Firm*—Cohen, Pontani, Lieberman & Pavane

[57] ABSTRACT

A process for connecting a flywheel with a clutch housing, including the following steps:
  a) providing the flywheel with a connection portion,
  b) providing the housing with a substantially cylindrical counter-connection portion, and
  c) sliding the housing on the connection portion by its counter-connection portion in a sliding direction substantially parallel to an axis of rotation for producing a press connection between the flywheel and housing. Step a) includes making the flywheel available with an insertion area which widens radially in the slide-on direction with respect to the axis of rotation and with a taper area following the insertion area that narrows in diameter in the slide-on direction. Step b) includes making the housing available with an inner dimension in the counter-connection portion, which inner dimension is smaller than an outer dimension of the flywheel in the area of a transition from the insertion area to the taper area.

17 Claims, 4 Drawing Sheets

PROCESS FOR CONNECTING A FLYWHEEL OF A CLUTCH WITH A CLUTCH

BACKGROUND OF THE INVENTION

1. Field of the Invention

The present invention is directed to a process for the connection of a flywheel of a clutch, especially a friction clutch in a motor vehicle, with a clutch housing.

2. Discussion of the Prior Art

In modern automotive engineering, the flywheels are generally connected with modular pressure plate subassemblies so that a clutch housing of the pressure plate subassembly is connected in a radial outer area to a radial outer area of the flywheel. For example, it is known to provide the flywheel with a cylindrical outer circumferential surface and to provide the housing with a corresponding cylindrical inner circumferential surface and to press the housing axially on the flywheel, so that a press fit is formed. This type of connection is disadvantageous in that there is often no adequate protection against rotation or twisting and the axial strength of the connection produced in this way is inadequate. It must be taken into account in this respect that considerable axial forces are generated within a motor vehicle friction clutch constructed in this way between the housing and the flywheel due to the diaphragm spring acting in the clutch or due to an energy accumulator of some other constructional type.

Furthermore, German reference DE 44 02 849 A1 discloses a connection between the flywheel and the housing in which the housing is welded to the flywheel. This process is labor-intensive and also involves the risk that deformations will be generated in the region of the housing and in the region of the flywheel due to the supply of heat energy required for welding.

It is known from German reference DE 44 24 479 C2 to construct the flywheel with conical surface area regions narrowing in diameter either away from or toward the housing and to introduce clamping devices, for example, in the form of clamping wedges or the like, axially into these surface area regions so as to create a press connection with the intermediary of these wedge elements. This type of connection is also very labor-intensive and, in particular, cannot lead to the desired axial strength of the connection. This is due to the fact that while the individual wedges can contact the flywheel with a counter-wedge surface, they contact the housing with surface area regions that are approximately parallel to the axis of rotation, so that only a frictional-engagement connection is created for coupling the housing to the flywheel in this case also.

Furthermore, German reference DE 40 14 470 A1 discloses a type of connection in which the housing can be connected with the flywheel by bending tabs which are provided at the housing. These tabs, when bent, engage in grooves or depressions formed at an outer circumferential surface of the flywheel.

SUMMARY OF THE INVENTION

Accordingly, it is an object of the present invention to provide a process for connecting a flywheel of a clutch, especially a friction clutch in a motor vehicle, with a clutch housing by which a dependably acting connection is produced between these components in a simple manner.

Pursuant to this object, and others which will become apparent hereafter, one aspect of the present invention resides in a process for connecting a flywheel of a clutch, especially a friction clutch in a motor vehicle, with a clutch housing, which comprises the following steps:

a) providing the flywheel with a connection portion;
b) providing the housing with a substantially cylindrical counter connection portion;
c) sliding the housing on the connection portion by its counter-connection portion in a sliding direction substantially parallel to an axis of rotation for producing a press connection between the flywheel and the housing.

Step a) includes providing the flywheel with an insertion area which widens radially in the displacing direction with respect to the axis of rotation and a taper area following the insertion area, which taper area narrows in diameter in the slide-on direction.

Further, step b) includes making the housing available with an inner dimension in the counter-connection portion which is smaller than an outer dimension of the flywheel in the area of transition from the insertion area to the taper area.

Therefore, the process according to the invention provides a connection between the flywheel and the housing of the clutch that is generated by producing a press fit. However, it is flywheel and the housing of the clutch that is generated by producing a press fit. However, it is important in this respect that the housing must curve along the transition area between the insertion area and the taper area when the housing is slid on axially, i.e., the housing will shape itself to this transition area and to the surface area portions adjoining this transition area in both axial directions. Accordingly, on the one hand, there is generated a connection acting by positive engagement and frictional engagement in the axial direction and providing an appreciable increase in connection strength. On the other hand, due to the radial spreading of the housing in the transition area and the surface regions adjoining the latter axially, the contact pressure prevailing between the housing and flywheel after the connection is produced is increased relative to a conventional press fit, so that an appreciably stronger frictionally engaging connection between these two components is also generated in the circumferential direction.

It is noted that the expression "dimension" as it is employed in the present Application, can refer to any suitable dimension which permits a comparison between the two components. For example, the inner diameter or outer diameter or only the corresponding radius can be utilized for comparison of quantities.

The transition area between the insertion area and the taper area is preferably formed by a surface area region which is formed with a substantially circular contouring considered in an axial plane, preferably with a radius of curvature in the range of 3 to 7 mm, most preferably approximately 5 mm. In this way, it can be ensured that the contact pressure force between the housing and the flywheel can be distributed to a larger surface area region in the area in which the housing is most highly loaded and in which the greatest pressing force acts between the housing and the flywheel. Therefore, excessive loading of the different components is prevented, a uniform flow of force and a uniform distribution of force is generated over a larger surface area region of the press fit, and an increased connection strength is provided in the circumferential direction as well as in the axial direction.

In another embodiment the taper area is a conically tapering surface region.

In order to further increase the connection strength, in a further embodiment of the invention the housing is plastically deformed in its counter-connection area when carrying out step c). This means that the full range of elasticity, i.e., the elastic deformability of the housing, is made use of in every case. Consequently, on the one hand, the contact pressure force which can be generated between the housing and the flywheel is utilized to the maximum extent and, on the other hand, the positive engagement effect which secures the two components against unwanted axial movement relative to one another is further reinforced by the transition into the plastic range of deformation.

In order to further increase the connection strength, in still a another embodiment a step d) is carried out following step c) for pressing the counter-connection portion essentially radially against the connection portion at least in the area in which the counter-connection portion and the taper portion are located opposite one another.

The present invention is further directed to a flywheel for a clutch, especially a friction clutch in a motor vehicle, comprising a connection portion for the press connection with a counter-connection portion of a clutch housing. The connection portion comprises an insertion area which widens radially in a slide-on direction and a taper area which adjoins the insertion area axially and narrows in diameter radially.

The taper area is preferably constructed so as to narrow in diameter substantially conically. In an additional embodiment, in order to prevent point-load peaks, a transition area from the insertion area into the taper area is formed by a surface area with a substantially circular profile, preferably with a radius of curvature in the range of 3 to 7 mm, most preferably approximately 5 mm.

In order to achieve the connection strength mentioned above, it is advantageous when a taper angle of the taper area is less than 2° with reference to an axis of rotation.

In a corresponding manner it is advantageous when an expansion angle or widening angle of the insertion area with respect to the axis of rotation ranges from 20 to 40°, and is preferably approximately 30°.

Further, a ratio of an axial length of the insertion area to an axial length of the taper area is advantageously in the range of 0.3 to 0.6, and is preferably approximately 0.5.

The present invention is further directed to a motor vehicle friction clutch comprising a flywheel, according to the invention, which has been connected to a clutch housing by a process according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 4:
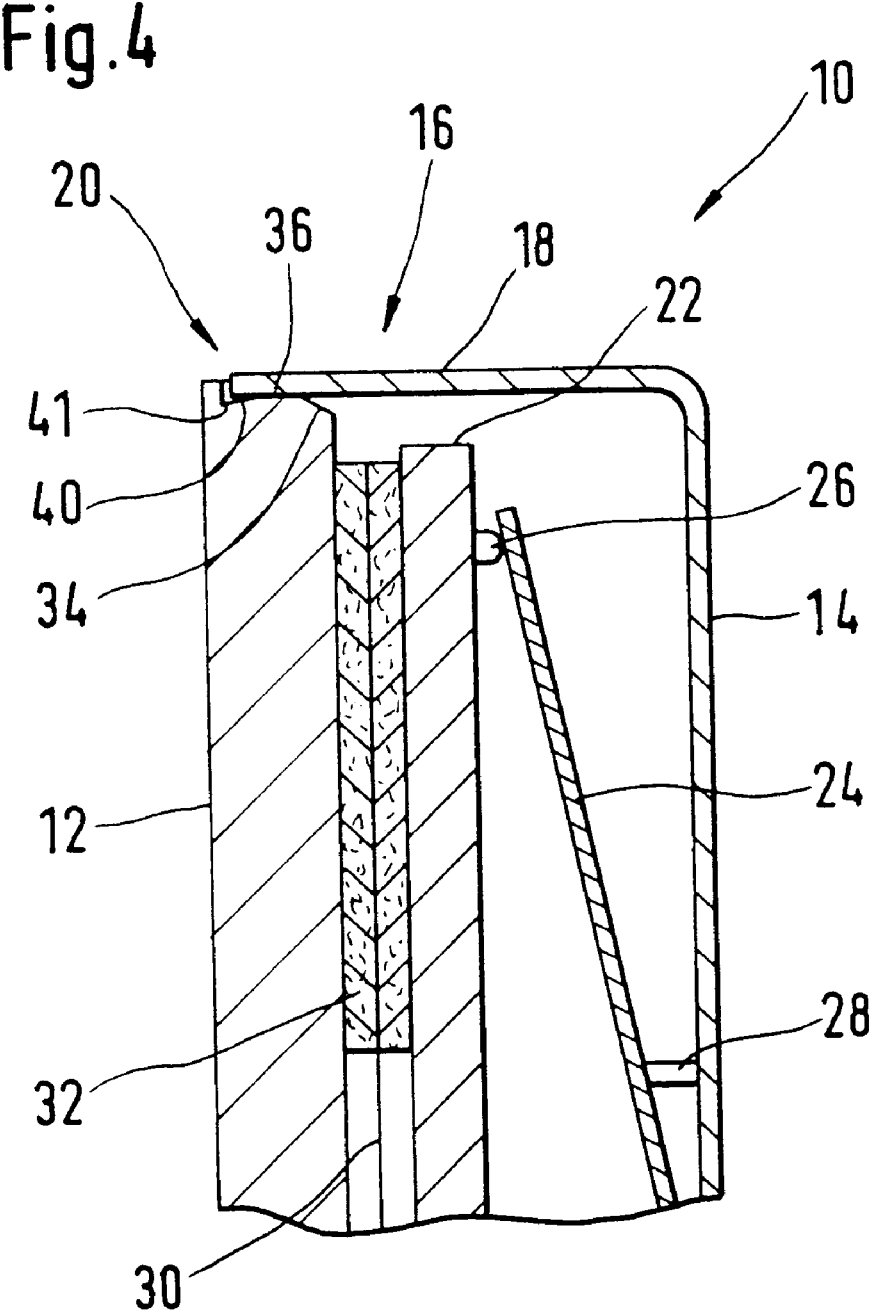
FIG. 4 is a schematic partial view in longitudinal section showing the basic construction of a motor vehicle friction clutch pursuant to the present invention.

First, the basic construction of a motor vehicle friction clutch 10 will be described with reference to FIG. 4. This motor vehicle friction clutch 10 comprises a flywheel 12 which is arranged at a drive shaft, not shown, for example, a crankshaft of an internal combustion engine, and is rotatable with this drive shaft about an axis of rotation A. A housing 14 is connected in a radial outer area 16 with the flywheel 12 in a manner to be described hereinafter. For this purpose the housing 14 has a cylindrical portion 18 which extends essentially axially and forms a counter-connection portion which is connected with an outer circumferential surface region 20 of the flywheel 12 which forms a connection portion of the flywheel 12.

A pressure plate 22, which is displaceable in the direction of the axis of rotation A with respect to the housing 14 but is fixed with respect to rotation relative to the housing 14, is provided in the housing 14. An energy accumulator, which is formed by a diaphragm spring 24 in the present embodiment, acts between the housing 14 and the pressure plate 22. The clutch shown in FIG. 4 is a push type clutch and the diaphragm spring 24 is supported in the radial outer area by a knife edge 26 at the pressure plate 22 and is held at the housing 14 in a radial center area via spacer bolts 28, or the like.

A clutch disk 30 is arranged between the pressure plate 22 and the flywheel 12. The clutch disk 30 can be clamped in with its friction linings 32 between the pressure plate 22 and the flywheel 12 by the pretensioning action of the diaphragm spring 24. The clutch disk 30 is connected in a manner known per se with a transmission input shaft (not shown) so as to be fixed with respect to rotation relative to it.

It is noted that the above-described construction of the clutch 10 is shown only by way of example and that modifications are possible in many areas without restricting the principle of the present invention, namely the type of connection between the housing 14 and the flywheel 12. For example, a readjusting device acting as wear compensation and controlled by play transmitters, not shown, or the like can be provided between the diaphragm spring 24 and the pressure plate 22 and/or the diaphragm spring 24 and the housing 14. The clutch can also be a push-type clutch and can be outfitted in different areas, for example, in the clutch disk or flywheel, with torsional vibration dampers. The individual components can be constructed from different materials, wherein, as is also the case in the present invention, the housing 14 is generally formed from a deformable sheet steel and the flywheel 12 is formed of gray cast iron.

Figure 1:
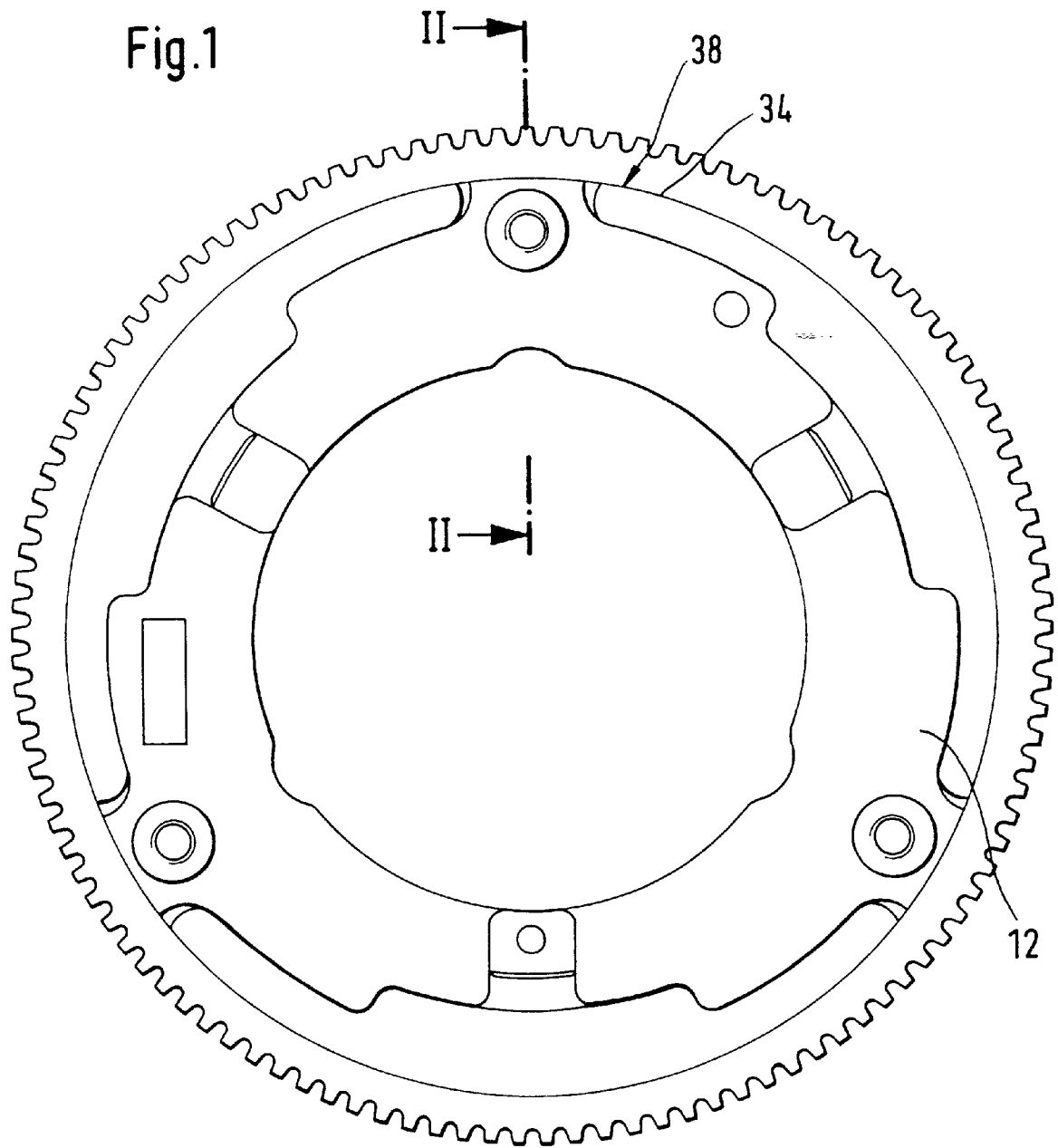
FIG. 1 shows an axial view of a flywheel according to the invention.
Figure 2:
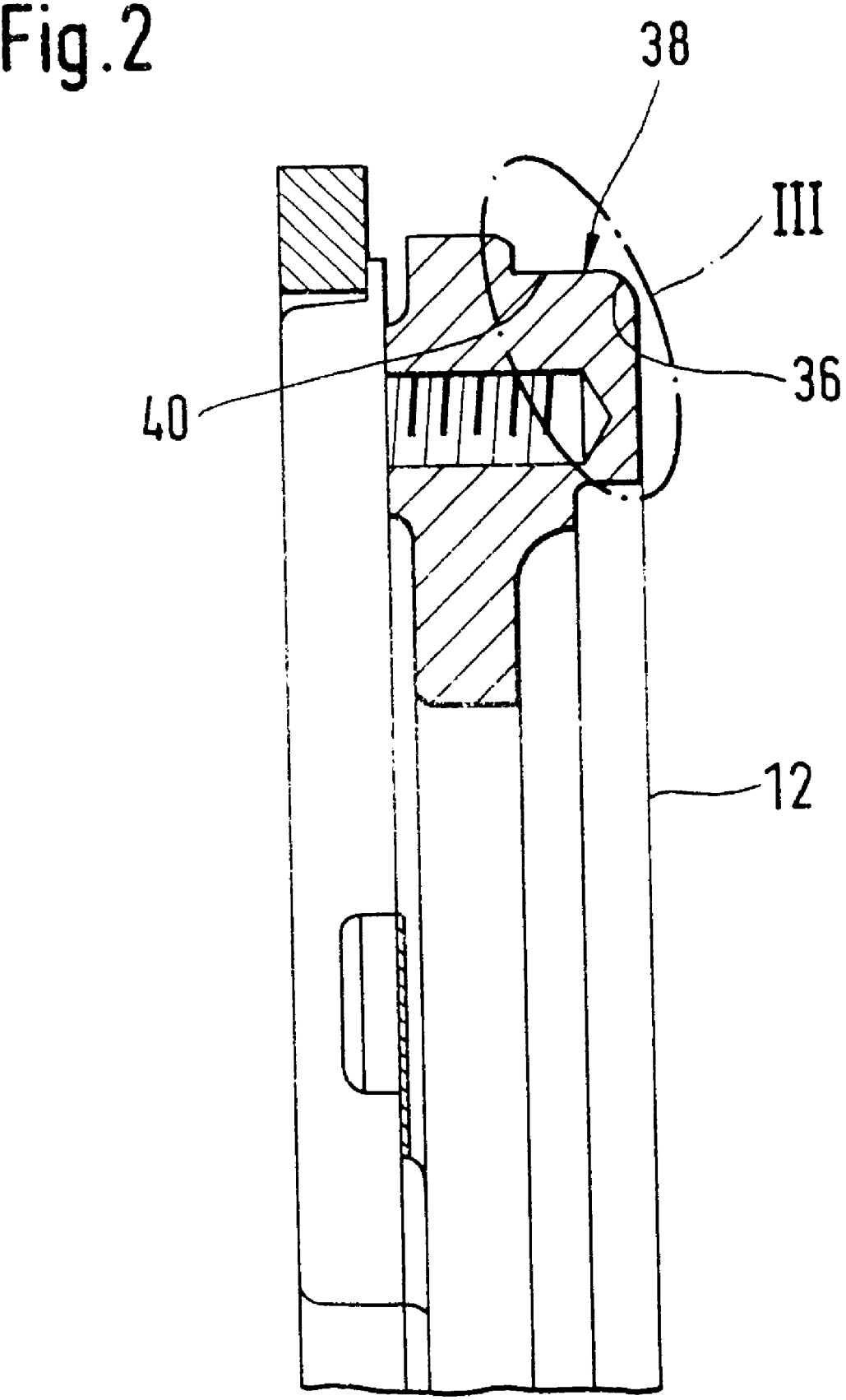
FIG. 2 shows a partial view in longitudinal section of the flywheel shown in FIG. 1 along a line II—II.
Figure 3:
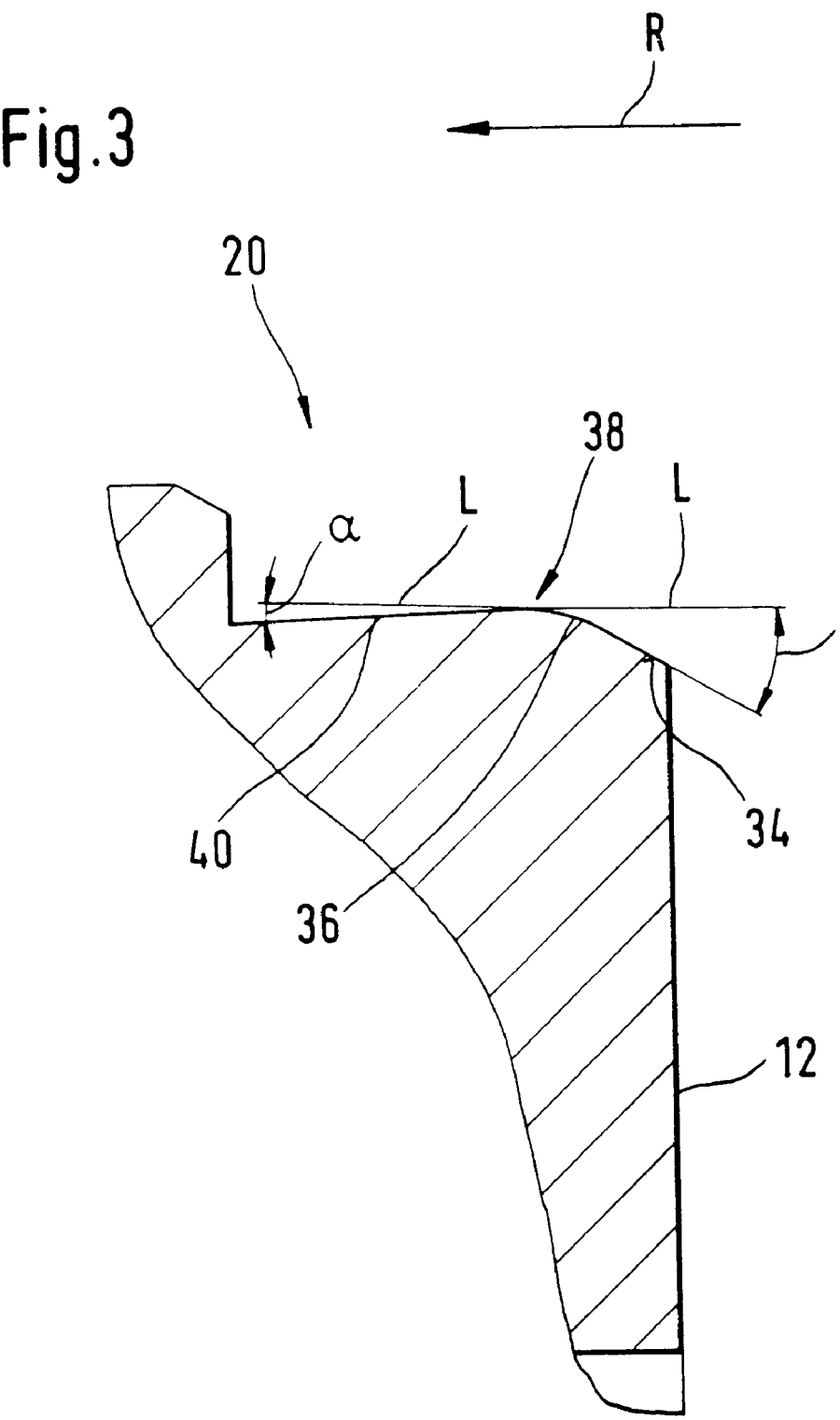
FIG. 3 shows an enlargement of the area III circled in FIG. 2.

With respect to FIGS. 1 to 3, the type of connection of the clutch housing 14 with the flywheel 12 is described in the following. As will be seen from FIG. 3 in particular, the flywheel 12, in its outer surface region 20 which is provided for the connection with the housing 14 and which, as was already mentioned, forms the connection portion 20, initially has an insertion area 34 in a sliding direction R in which the housing 14 is slid axially on the flywheel 12 for producing a press fit, wherein the flywheel 12 widens in the insertion area 34 in direction R. As will be seen in FIG. 3, the construction can be carried out in such a way that the flywheel 12 is constructed in this area 34 with a surface which extends essentially conically, i.e., widens in a straight line in section, wherein a widening angle β preferably lies in the range of 30° in this case.

Adjoining this area 34 axially is a transition area 36 which forms a vertex at 38, i.e., an area in which there is the greatest radial distance to the axis of rotation A and which passes into a taper area 40. In this taper area 40, the radial distance from the surface region 20 to the axis of rotation A decreases in the slide-on direction R. It will be seen in FIG. 3 that a conical arrangement is also preferably provided in this case, wherein a taper angle α with respect to the axis of rotation A or with respect to a line L extending parallel to the axis of rotation A and passing through the vertex 38 is less than 2°.

Further, in the clutch 10 according to the invention, the housing 14 is constructed in such a way that the inner diameter in the cylindrical portion 18 of the same is less than the outer diameter of the flywheel 12 in the region of the vertex 38, but greater than the smallest diameter of the insertion area 34 at its axial beginning and preferably also greater than the smallest diameter of the taper area 40 at its axial end remote of the vertex 38 (considered in direction R).

In order to connect the housing 14 with the flywheel 12, the housing 14 is advanced toward the flywheel 12 in the direction R until the insertion area 34 of the flywheel 12 enters into the cylindrical portion 18. The axial end of the cylindrical portion 18 then rests against the insertion area 34 and is widened in the radial direction by continued exertion of an axial pressing force and is displaced along the transition area 36 and the vertex 38 until reaching the taper area 40. During this displacing movement, the housing 12 is expanded radially in its cylindrical portion 18, that is, preferably to such an extent that it is expanded beyond the limits of elastic deformability and after the connection is produced rests against the flywheel 12, i.e., its outer circumferential surface 20, in the transition area 36, i.e., in the area of the vertex 38 and against the axially adjoining portions of the taper area 40 and of the insertion area 34 while producing a radially inwardly directed contact pressing force.

In this way, a connection acting in a frictionally engaging and positively engaging manner can be generated in the axial direction A and, due to the fact that the transition area 36 with virtually circular contouring is provided, wherein a preferred radius of curvature is in the range of 5 mm, a load concentration can be prevented in this area, i.e., the contact pressure force can be distributed on a greater surface area region, but there is a stronger contact pressing pressure nevertheless. Accordingly, a very dependably acting frictionally engaging connection can also be generated in the circumferential direction which, in particular, provides a uniform flow of force distributed over the circumferential surface.

Due to the continuous, smooth transition between the insertion area 34 and the taper area 40, a more uniform flow of pressing force is provided during the axial pressing, which results in that the diaphragm spring position can be very exactly adjusted in a continuous manner.

It will be seen that a press fit can be provided according to the present invention in a considerably simpler manner compared with the types of connection known from the prior art while nevertheless providing a substantially improved connection strength. This connection strength can be increased in addition in that after the housing 14 is slid onto the flywheel 12 axially, the cylindrical portion 18 of the housing 14 is rolled in order to increase contact pressing force or, if required, is also provided with notches or undercuts in the area in which the cylindrical portion 18 overlaps the taper area 40 but does not directly contact the latter as is shown at 41 in FIG. 4. This is particularly advantageous when the clutch housing 14 has been removed from the flywheel 12 for maintenance purposes and is slid onto the flywheel 12 once again after plastic deformation has already been carried out once. The desired strength can also be achieved in this second connection process by means of the subsequent rolling or, as the case may be, the production of notches.

It is noted that in the flywheel 12, according to the invention, the insertion area 34 need not have the straight-line contouring at its beginning portion, but rather can also already be constructed at that location with curvature and can accordingly have the circularly curved contouring approximately throughout its entire area. The taper area 40 can also be constructed with a curved shape, so that when considered in an axial plane parallel to the axis of rotation A, wherein, for example, this axial plane can be the drawing plane in FIG. 3, a spherical contouring of the connection area 20, i.e., of the outer circumferential area 20 of the flywheel 12, can be provided.

Further, it is possible to produce the connection between the housing and the flywheel or to reinforce the connection process in that the housing is initially heated in the area of its counter-connection portion 18 in order to widen the latter radially and is cooled after sliding on the flywheel 12, so that a connection can be achieved in this case in the manner of a shrink-on process. The radial contact pressing forces can then be further increased, wherein it must be ensured in this procedure that the introduction of heat is not so great that deformations occur in the region of the housing.

It is noted that the respective areas, namely the insertion area 34, the transition area 36, and the taper area 40, need not be completely continuous areas in the circumferential direction, but can be individual areas separated by intermediate portions.

The invention is not limited by the embodiments described above which are presented as examples only but can be modified in various ways within the scope of protection defined by the appended patent claims.

We claim:

1. A process for connecting a flywheel of a clutch having a clutch housing, the flywheel having an axis of rotation, the process comprising the steps of:

a) providing the flywheel with a connection portion;

b) providing the housing with a substantially cylindrical counter-connection portion; and c) sliding the counter-connection portion of the housing onto the connection portion in a slide-on direction substantially parallel to the axis of rotation for producing a press connection between the flywheel and the housing by plastically deforming the housing in the counter-connection area, step a) including providing the flywheel with an insertion area which widens radially in the slide-on direction with respect to the axis of rotation, and a taper area following the insertion area and narrowing in diameter in the slide-on direction, step b) including providing the housing with an inner dimension in the counter-connection portion which is smaller than an outer dimension of the flywheel in an area of transition from the insertion area to the taper area.

2. A process according to claim 1, wherein the transition area is a surface area region formed with a rounded contouring considered in a plane extending along the axis of rotation.

3. A process according to claim 2, wherein the contouring has a radius of curvature of 3 to 7 mm.

4. A process according to claim 3, wherein the contouring has a radius of curvature of approximately 5 mm.

5. A process according to claim 1, wherein the taper area is provided so as to narrow in diameter conically.

6. A process according to claim 1, and further comprising a step d), following step c), of pressing the counter-connection portion essentially radially against the connection portion at least in an area in which the counter-connection portion and the taper area are located opposite one another.

7. A flywheel for a clutch, comprising a connection portion for a pressing connection with a counter-connection portion of a clutch housing whereby the counter-connection portion is plastically deformed, the connection portion including:

an insertion area which widens radially in a slide-on direction; and a taper area which adjoins the insertion area axially and narrows in diameter radially in the slide-on direction.

8. A flywheel according to claim 7, wherein the taper area is constructed so as to narrow in diameter substantially conically.

9. A flywheel according to claim 7, wherein a transition area is arranged between the insertion area and the taper area, the transition area being formed by a surface with a substantially circular profile.

10. A flywheel according to claim 9, wherein the circular profile of the surface has a radius of curvature of 3 to 7 mm.

11. A flywheel according to claim 10, wherein the circular profile of the surface has a radius of curvature of approximately 5 mm.

12. A flywheel according to claim 7, wherein the taper area has a taper angle $\alpha$ with reference to an axis of rotation of the flywheel, wherein $0° < \alpha << 2°$.

13. A flywheel according to claim 12, wherein the insertion area is configured to have a widening angle with respect to the axis of rotation of 20 to 40°.

14. A flywheel according to claim 13, wherein the widening angle is approximately 30°.

15. A flywheel according to claim 7, wherein the insertion area and the taper area are configured so that a ratio of an axial length of the insertion area to an axial length of the taper area is in a range of 0.3 to 0.6.

16. A flywheel according to claim 15, wherein the ratio is approximately 0.5.

17. A motor vehicle friction clutch, comprising:

a clutch housing having a substantially cylindrical counter-connection portion;

a flywheel having a connection portion for a pressing connection with the counter-connection portion of the clutch housing, the connection portion including an insertion area which widens radially in a slide-on direction, and a taper area which adjoins the insertion area axially and narrows in diameter radially in the slide-on direction, the flywheel having an axis of rotation and being connected to the clutch housing by sliding the counter-connection portion of the housing onto the connection portion in the slide-on direction substantially parallel to the axis of rotation for producing the press connection between the flywheel and the housing by plastic deformation of the counter-connection portion of the housing, the housing having an inner dimension in the counter-connection portion which is smaller than an outer dimension of the flywheel in an area of transition from the insertion area to the taper area.

* * * * *